(12) United States Patent
Takashima et al.

(10) Patent No.: US 6,719,280 B2
(45) Date of Patent: Apr. 13, 2004

(54) VIBRATION-ISOLATING DEVICE

(75) Inventors: Yukio Takashima, Osaka (JP);
Kentaro Yamamoto, Osaka (JP)

(73) Assignee: Toyo Tire & Rubber Co., Ltd., Osaka (JP)

(*) Notice: Subject to any disclaimer, the term of this patent is extended or adjusted under 35 U.S.C. 154(b) by 0 days.

(21) Appl. No.: 10/094,772

(22) Filed: Mar. 11, 2002

(65) Prior Publication Data

US 2003/0067104 A1 Apr. 10, 2003

(30) Foreign Application Priority Data

Oct. 10, 2001 (JP) ........................................ 2001-313327

(51) Int. Cl.⁷ ................................................. F16F 13/00
(52) U.S. Cl. ................................................... 267/140.13
(58) Field of Search ........................ 267/140.13, 140.3, 267/141, 141.4, 114.5

(56) References Cited

U.S. PATENT DOCUMENTS

| | | | | |
|---|---|---|---|---|
| 3,642,268 A | * | 2/1972 | Hipsher | 267/281 |
| 4,159,091 A | * | 6/1979 | Le Salver et al. | 267/140.13 |
| 4,588,173 A | | 5/1986 | Gold et al. | |
| 4,679,777 A | * | 7/1987 | Gold et al. | 267/140.13 |
| 4,997,168 A | | 3/1991 | Kato | |
| 5,340,094 A | * | 8/1994 | Schyboll et al. | 267/219 |
| 5,718,407 A | * | 2/1998 | Lee | 248/634 |
| 5,782,462 A | * | 7/1998 | Hein et al. | 267/140.13 |
| 5,979,883 A | * | 11/1999 | Mizutani et al. | 267/140.13 |
| 6,511,060 B2 | * | 1/2003 | Yamamoto et al. | 267/140.13 |

FOREIGN PATENT DOCUMENTS

| | | |
|---|---|---|
| JP | 10-38015 | 2/1998 |
| JP | 11-132279 | 5/1999 |

* cited by examiner

*Primary Examiner*—Jack Lavinder
*Assistant Examiner*—Xuan Lan Nguyen
(74) *Attorney, Agent, or Firm*—Jordan and Hamburg LLP

(57) ABSTRACT

Vibration-isolating device including a vibration-isolating substrate formed of a rubber elastomer, first and second fittings each connected to a respective sides of the substrate, a first stopper portion arranged in connection with the first metal fitting, an outwardly projecting flange arranged in connection with the second metal fitting and a stopper metal fitting. The stopper metal fitting includes a caulking and fastening portion which is caulked and fastened with at least a part of the flange, and a second stopper portion arranged proximate and abutting against the first stopper portion. Outer circumferential surfaces of the base body and the second metal fitting are substantially oval and outer edges of the caulking and fastening portion and the flange trace along an imaginary circle around a central axis, at least at areas caulked and fastened.

14 Claims, 6 Drawing Sheets

VIBRATION-ISOLATING DEVICE

FIELD OF THE INVENTION

The present invention relates to a vibration-isolating device used to support a power unit such as a vehicle engine and other vibration generating sources for the purpose of vibration isolation.

BACKGROUND OF THE INVENTION

A liquid-containing vibration isolator is taken as an example to describe a vibration-isolating device which supports a vibration generating source such as a car engine so as not to transmit its vibration to the vehicle body. The liquid-containing vibration isolator is typically configured so that a partition portion and a diaphragm are disposed inside the vibration-isolating device having a vibration-isolating substrate formed from a rubber elastomer and configured to constitute within the walls first and second liquid chambers which seal in liquid. These liquid chambers are connected by an orifice pathway, and the vibration damping function and the vibration isolating function are exhibited by the liquid flow effects of both liquid chambers by means of the orifice pathway and the vibration absorbing effects of the vibration isolating substrate. Various types of such vibration-isolating devices are known.

For example, in JP-A-132279/1999, a first attachment metal fitting embedded at the top center of the vibration-isolating substrate is vulcanization adhered, and a cylindrical metal fitting is vulcanization adhered at the outside of the lower part of the vibration isolating substrate. Then, the lower edge of the cylindrical metal fitting is sandwiched between an annular metal fitting, which retains the diaphragm, and the circumference of the partition portion and is caulked to the flange at the upper edge of a cylindrical second attachment metal fitting, this jig having a bottom. Furthermore, an L-shaped cross section stopper metal fitting is disposed to prevent the vibration-isolating substrate from excessively deforming. The stopper metal fitting is fixed to the cylindrical metal fitting by caulking the lower edge portion of the stopper metal fitting to the flange portion projecting outwardly from the upper edge of the cylindrical metal fitting, and carries out the stopper function when the lower surface of the upper edge horizontal portion of the stopper abuts the rubber layer on a part of the first attachment metal fitting.

On the one hand, in JP-A-38015/1998, the aforementioned L-cross section stopper fitting is annular and completely surrounds the vibration-isolating device.

The vibration-isolating devices described above are all configured to have a circular cross-section, taken perpendicular to the central axis. This is because a circular cross-section amenable to the manufacturing process. For example, when the stopper metal fitting described above is fitted by caulking operations, it is easy to produce the lower edge portion to be caulked and also perform caulking operations, allowing secure caulking operations without any problem even if the rotational position is slightly out of place.

However, when the vibration-isolating devices are configured in the form of a generally circle, useless space may be produced in the partition portion, depending on configuration of the partition's orifice pathway for providing necessary vibrational damping or on the configuration of a second diaphragm or a third liquid chamber etc. in the partition portion.

In recent years, with the high demand for smaller automobiles and for freedom of design and engineering, installation space of the vibration-isolating device may be limited more than before, so it is important to achieve the vibrational damping performance required while holding down the size of the vibration-isolating device.

OBJECTS AND SUMMARY OF THE INVENTION

In view of the aforementioned problems, the present invention provides a vibration-isolating device equipped with stopper metal fittings to restrain excessive deformation which is capable of effectively making use of limited installation space and to which the stopper metal fittings are easily and securely assembled.

A liquid-containing vibration-isolating device of the present invention comprises a vibration-isolating substrate formed of a rubber elastomer, a first metal fitting connected to one side of the vibration-isolating substrate, a second cylindrical or annular metal fitting connected to the other side of the vibration-isolating substrate, a first stopper portion provided on the first metal fitting or a metal fitting connected to the first metal fitting, a flange portion projecting outwardly and provided on the second metal fitting or a metal fitting connected to the second metal fitting, a caulking portion to be caulked to at least a part of the above flange portion, and a stopper metal fitting having a second stopper portion close to the first stopper portion and disposed so as to be able to abut on the first stopper portion. The vibration-isolating substrate and the outer circumference of the second metal fitting trace an elliptical shape as viewed from the axial direction, and that at least the places where the outer edges of the caulking portion and the flange portion connect with each other are provided along the circumference of a circle around the central axis.

The aforementioned configuration allows the installation of the liquid-containing vibration-isolating device in a limited space which thus is effectively utilized, so that the accommodation of objects into automobiles is improved and the stopper metal fitting can be easily and securely assembled while optimizing the position of the stopper metal fitting around the central axis.

The elongated circle described above is made up of two equal semicircles and two straight lines smoothly connecting these semicircles, in the form of an oval typically seen in an athletic or race track.

Preferably, the caulked edges are disposed at the intersections of the elongated circle or the ellipse with its major axis, and the length of the flange in the direction of the minor axis of the elongated circle or the ellipse is smaller than the diameter of the axial cross section of the above circle around the central axis.

In these configurations, the limited installation space can be utilized more effectively.

DETAILED DESCRIPTION OF THE INVENTION

The embodiments of the present invention will be hereinafter described by way of one example with reference to FIGS. 1–6. A vibration-isolating device of the example is of the liquid-containing type and has a cross-section perpendicular to the central axis similar to an elongated circle.

Figure 1:
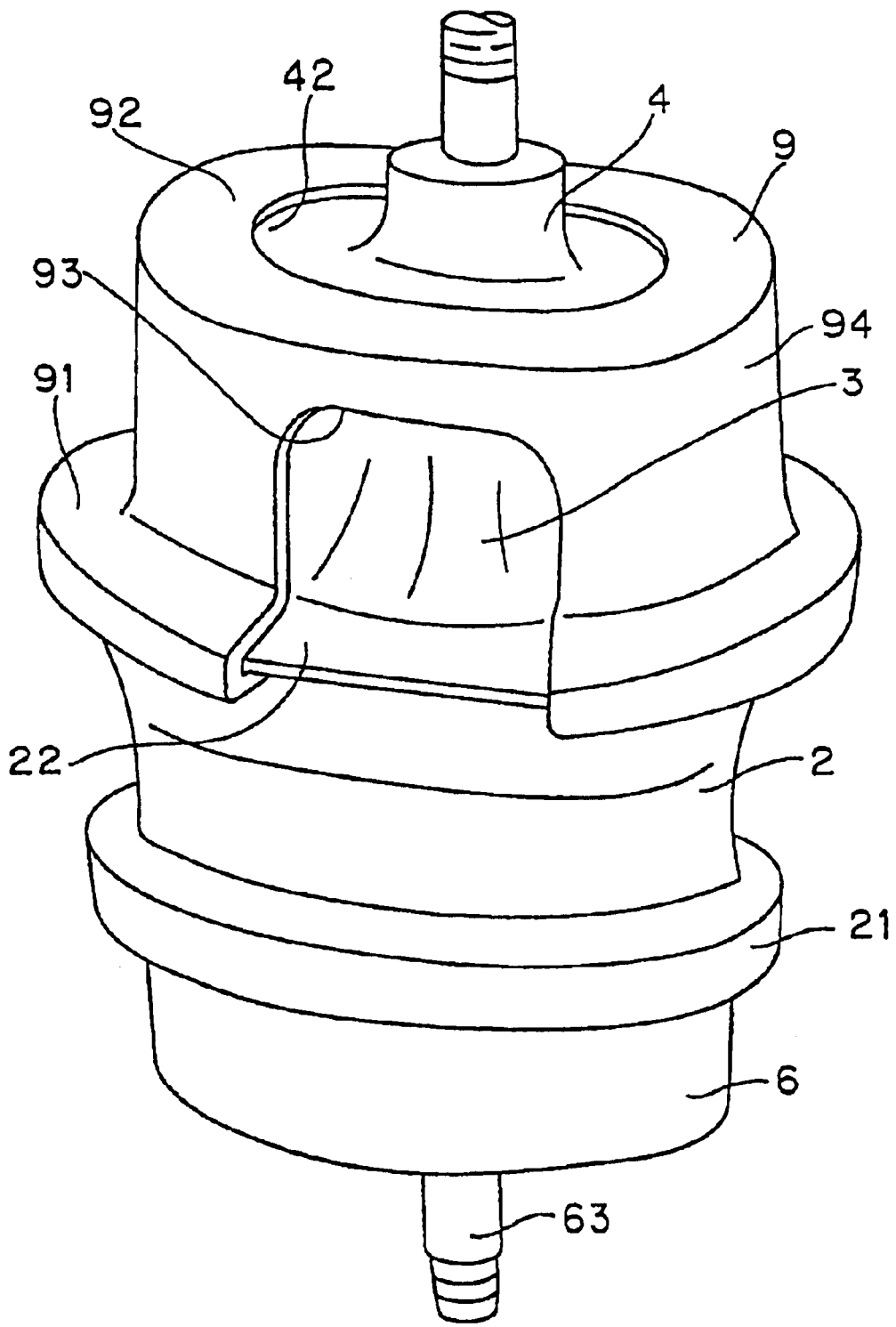
FIG. 1 is a perspective view showing a vibration-isolating device in accordance with a first embodiment of the invention.
Figure 2:
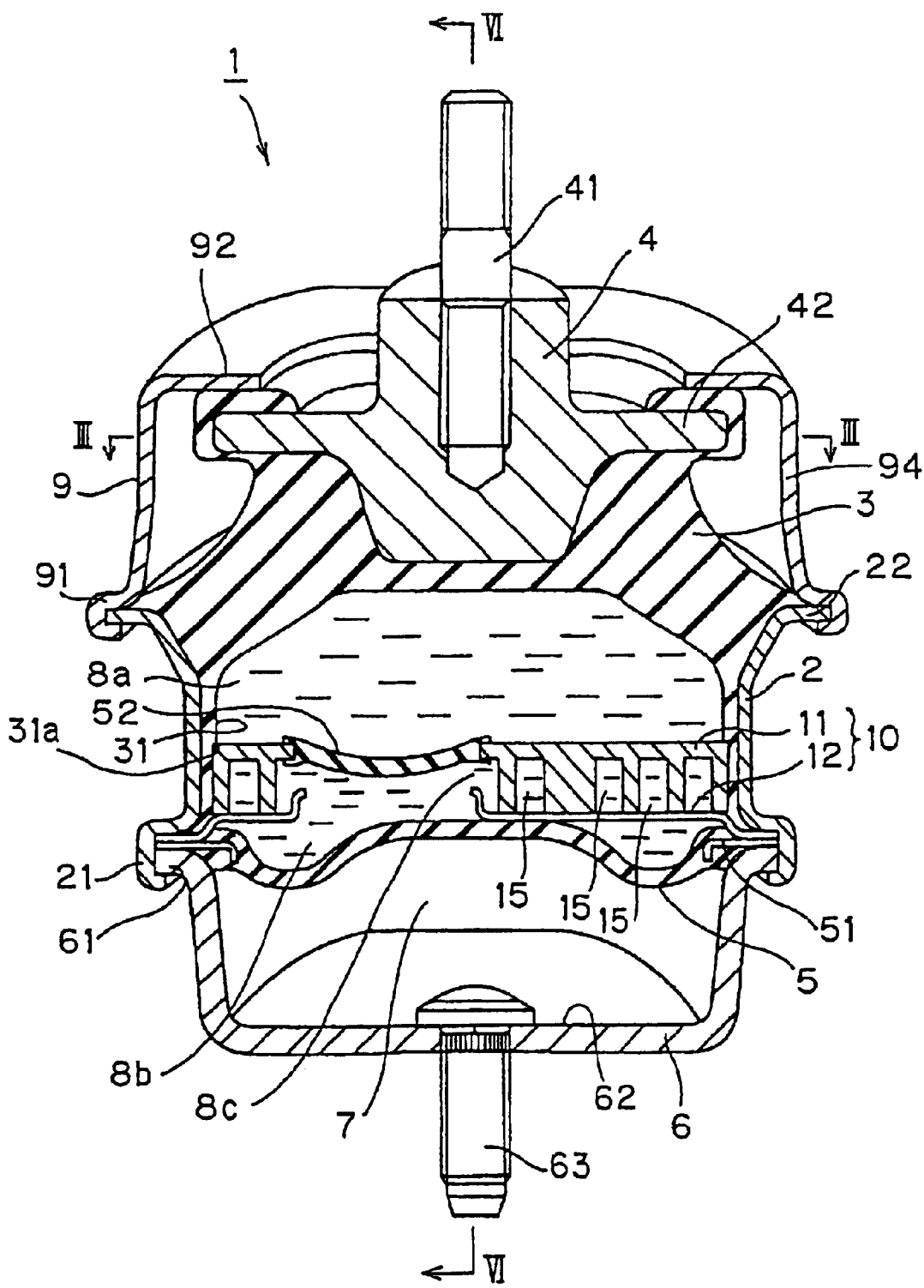
FIG. 2 is a schematic longitudinal section view showing the structure in cross-section cut along the major axis of an elongated circle with reference to the vibration-isolating device of FIG. 1.
Figure 3:
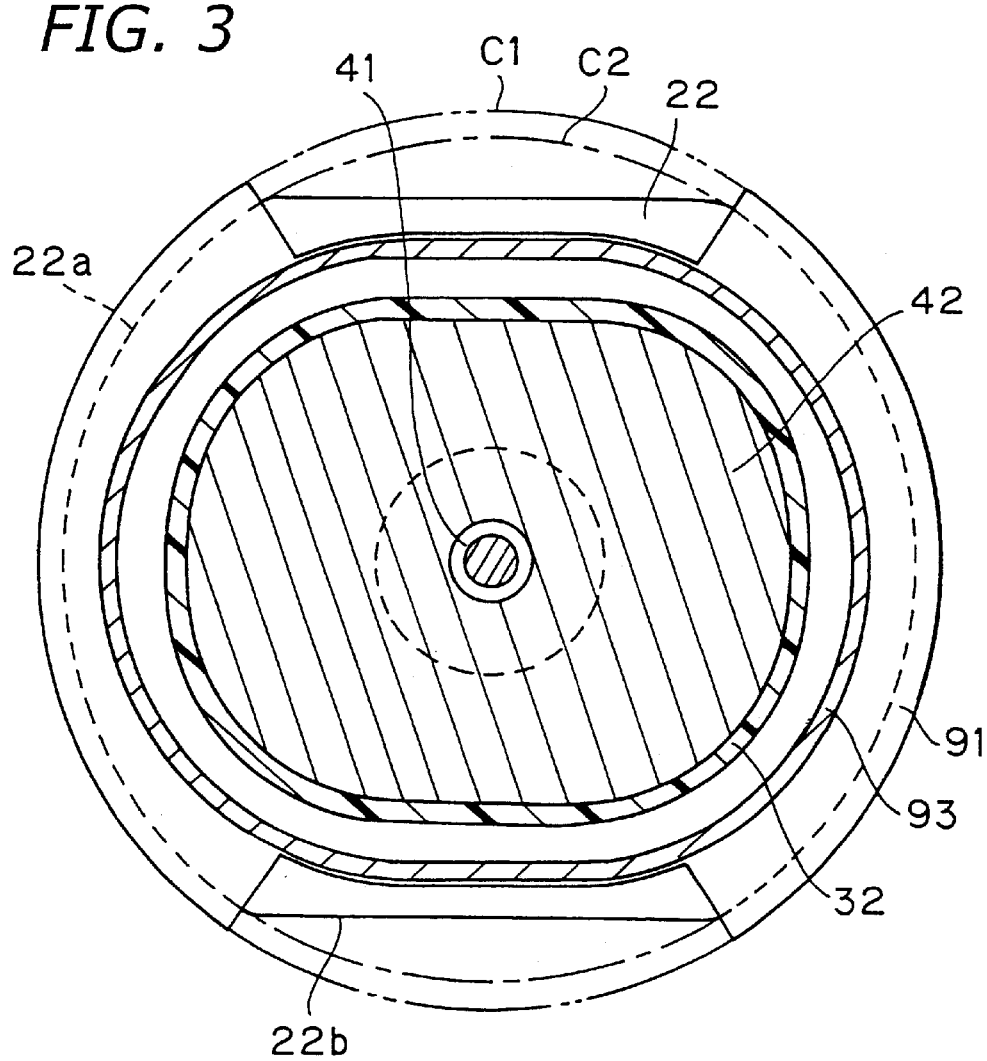
FIG. 3 is a transverse cross section cut at a stopper portion of a first attachment metal fitting taken along the line III—III in FIG. 2 with reference to the vibration-isolating device shown in FIG. 1.
Figure 4:
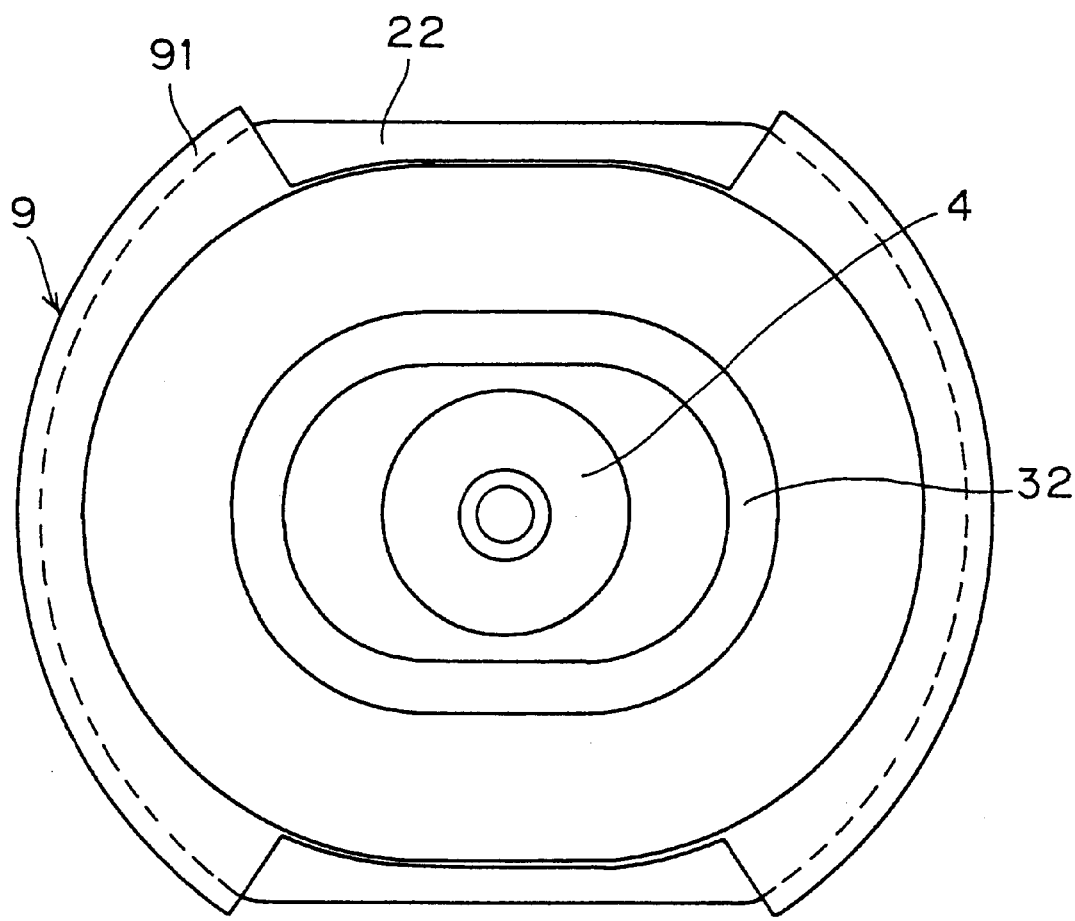
FIG. 4 is an exterior view from above with reference to the liquid-containing vibration-isolating device of FIG. 1.

FIG. 1 is a perspective view showing the appearance of one embodiment of a vibration-isolating device in accordance with the invention. FIG. 2 is a schematic longitudinal sectional view in perspective of the vibration-isolating device of FIG. 1, showing a cross-sectional plane cut along the major axis of an elongated circle. FIG. 3 is a cross-sectional view taken along the line III—III in FIG. 2 cut at a stopper portion of a first attachment metal fitting. FIG. 4 is an exterior view from above.

As shown in FIGS. 1–4, the liquid-containing vibration-isolating device 1 of the example includes a vibration-isolating substrate 3 made up of a rubber elastomer and which receives a load from a power unit such as an engine. The vibration-isolating substrate is connected to the upper opening side of a cylindrical main metal fitting (2) and at its upper edge to the first attachment metal fitting (4). That is, the cylindrical main metal fitting (2) and the first attachment metal fitting (4) are connected through the vibration-isolating substrate (3). As shown in FIGS. 1–6, the vibration-isolating substrate (3) assumes a "generally elongated circle truncated cone", that is, assuming the rough shape of a truncated cone elongated sidewise. The upper, small diameter side of the vibration-isolating substrate (3) is securely stuck to the first attachment metal fitting (4), and the outer circumference of the lower, large diameter side is securely stuck to an opening portion of the main metal fitting (2), both by vulcanization adhering means to make the connections airtight.

On the lower opening side of the main metal fitting (2), a first diaphragm (5) made of a rubber film is placed so that it faces the vibration-isolating substrate (3) and a second lower attachment metal fitting (6) attached around the first diaphragm (5) is secured and sealed by caulking operations described later.

Furthermore, a partition portion (10) is fitted airtight through a seal rubber layer (31) integrally molded with the vibration-isolating substrate (3) on the inner circumference of the main metal fitting (2) between the vibration-isolating substrate (3) and the diaphragm (5). Thus, an inner chamber between the vibration-isolating substrate (3) and the diaphragm (5) is formed as a liquid-containing chamber in which non-compressive liquid such as water or ethylene glycol is contained. The liquid-containing chamber is partitioned and configured by means of the partition portion (10) into a first liquid chamber (8a), in which the vibration-isolating substrate (3) constitutes a part of the chamber wall, and a second liquid chamber (8b), in which the diaphragm (5) constitutes a part of the chamber wall. The liquid chambers (8a), (8b) are connected by an orifice pathway (15) formed in the partition portion (10). This results in the configuration of a two-chamber type liquid-containing vibration-isolating device.

As shown in FIGS. 1–6, the first attachment metal fitting (4) is in the shape of a spinning top having a stopper portion (42) in the form of a flange projecting outwardly all along the circumference. At least the edge of the stopper portion (42) is covered by a rubber layer (32) which is an extension of the vibration-isolating substrate (3). On the one hand, the first mounting bolt (41) secured by screwing, press-fitting, or welding operations to the first attachment metal fitting (4) is fitted to stick upwards from the center of the first attachment metal fitting (4). The first attachment metal fitting (4) is secured by the first mounting bolt (41) to a bracket of a power unit of an automobile not shown.

The second attachment metal fitting (6) is in the form of a generally cylindrical form with a bottom, and a flanged opening edge portion (61) is secured with caulking to the lower edge (21) of the main metal fitting (2). Furthermore, a second mounting bolt (63) is press-fitted to point downward from the bottom (62) of the second attachment metal fitting (6). An empty space between the second attachment metal fitting (6) and the first diaphragm (5) forms an air chamber (7). The second attachment metal fitting (6) is fixed at a predetermined place positioned with respect to a vehicle body side member (not shown) by the second mounting bolt (63).

That is, the power unit can be supported and separated from the vehicle body for the purpose of vibration isolation by fitting the upper first attachment metal fitting (4) to the power unit of the engine and the like and the lower second attachment metal fitting (6) to the vehicle body side member.

Furthermore, because the body portion including the vibration-isolating substrate (3), the main metal fitting (2), the second attachment metal fitting (6), and the first liquid chamber (8a) is formed into an elongated circle shape as viewed from the axial direction, the body portion is configured to have a small size in the direction of the minor axis (the fore-and-aft direction in FIGS. 1 and 2) and therefore make the installation of other objects easier.

As shown in FIGS. 1–4, an annular stopper metal fitting (9) is disposed on the vibration-isolating device (1) to restrain the vibration-isolating substrate (3) from receiving excessive deformation. The stopper metal fitting (9) is constructed in an inverted L-cross section annular shape, extending from the upper edge of the main metal fitting (2) over the stopper (42) of the first attachment metal fitting (4) and surrounding the vibration-isolating substrate (3). The stopper metal fitting (9) includes the caulking portion (91) caulked at the upper end flange (22) of the main metal fitting (2), a cylindrical portion (94) which is a roughly vertical wall, and an inner flange (92) covering the top surface of the stopper portion (42) projected inwardly from the upper end of the cylindrical portion (94).

The stopper metal fitting (9) performs the stopper function by making the lower surface of its inner flange (92) abut on the upper surface of the stopper portion (42) when the first attachment metal fitting (4) is sharply raised and also by making the inner circumferential surface at the upper end of the cylindrical portion (94) abut on the outer circumferential surface of the stopper portion (42) when the first attachment metal fitting (4) is greatly displaced laterally.

Since the lower extremity of the vibration-isolating substrate (3) and the main metal fitting (2) are formed into an elongated circle shape in cross-section, the cylindrical portion (94) of the stopper metal fitting (9) is also formed into a similar elongated circle shape in cross-section. Further, the inner edge of the inner flange (92) also assumes the elongated circle shape as shown in FIG. 4.

As shown in FIGS. 1, 3 and 4, the caulking portion (91) at the lower end of the stopper metal fitting (9) is disposed only at the places along the lateral semicircular portion of the elongated circle shape assumed by the outer edge of the lower extremity of the vibration-isolating substrate (3). Besides, the portions on the cylindrical portion (94) are also cut away (93) where caulking operations are not performed. That is, cutouts (93) are made on the lower portions of the cylindrical portion (94) above the straight line portions at the front and rear of the elongated circle shaped lower edge.

As shown in FIGS. 3 and 4, the outer edge of the caulking portion (91) on both lateral sides nearly and substantially traces portions of a single circle (C1) of large diameter around the central axis of the vibration-isolating device (1). The portions of the outer edge of the upper end flange portion (22) of the main metal fitting (2) which are caulked, that is, the left and right fastening flange portions (22a), also extend along the circumference of the circle (C1), to be precise tracing a circular arc nearly equivalent to the inside measurements of the caulking portion (91) (inside diameter of outer edge portion). Therefore, if rotational position of the stopper metal fitting (9) is somewhat misaligned with the main metal fitting (2), caulking operations are still carried out well without any clearance between the inside of the caulking portion (91) and the outer circumference of the fastening flange portion (22a).

As seen in FIGS. 3 and 4, while the flange portion (22) at the upper end of the main metal fitting (2) is formed all along the circumference, on an unfastened flange portion (22b) where caulking is not performed, its outer edge traces a straight line extending in the lateral direction (in the direction of major axis of an elongated circle in cross-section) instead of a circular arc. In detail, it traces a straight line obtained by connecting both ends of the circular arc, that is, the outer circumference of the lateral fastening flange portion (22a), to each other. In other words, it is just like a shape obtained when cutting out front and rear portions along a straight line in the lateral direction from a single circle (C2) of large diameter which overlaps the outer edges of the lateral fastening flange portions (22a).

Such a flange portion (22) at the upper end of the main metal fitting (2) is generally formed by punching. Furthermore, the caulking portion (91) at the lower end of the stopper metal fitting (9) is produced, for example, by the following process. First, the lower edge portion of the stopper metal fitting (9) is formed by drawing along a predetermined circle. Then, the fastening flange portion (22a) is caulked while being positioned rotationally.

Figure 5:
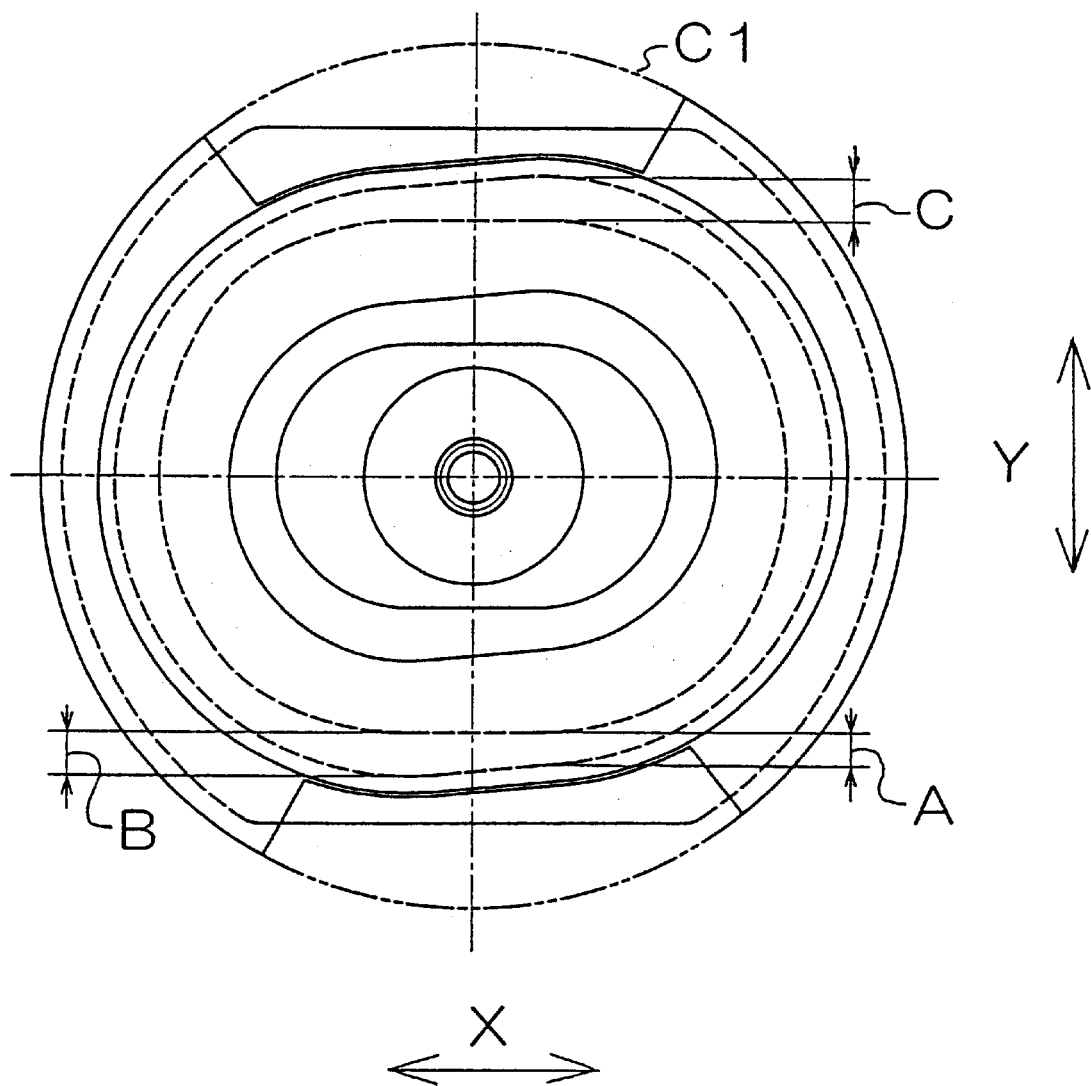
FIG. 5 is a plan view showing the condition where rotational positions of the stopper metal fitting and the main metal fitting are misaligned.

A top view of the device shows the condition when the rotational positions of the stopper metal fitting (9) and the stopper portion (42) are misaligned FIG. 4 (see FIG. 5). Reference characters A, B and C in FIG. 5 all denote a clearance between the rubber coated outer circumferential surface of the stopper portion (42) and the inner circumferential surface at the upper extremity of the cylindrical portion (94) of the stopper metal fitting (9). Especially, it indicates clearance at the straight line portions of the elongated circles, as viewed in cross section, of the stopper portion (42) and the cylindrical portion (94). As shown in FIG. 5, when relative rotational position is misaligned, the clearance on the straight line side will gradually increase or decrease along the direction of the major axis of the elongated circle (X-direction) (A≠B). Besides, the two clearances A and C on both sides of the stopper portion (42) in the direction of a minor axis of the elongated circle (Y-direction) will not be equalized (A≠C).

Such slippage of the rotational position of the stopper metal fitting (9) making the clearance needed for the stopper function unequal is not desirable.

On the other hand, when the fastening portion between the stopper metal fitting and the flange portion supporting the stopper metal fitting is configured just as this example, fastening operations can be done easily and securely while optimizing rotational position. For example, if rotational position slips out of place when vulcanization adhering the first attachment metal fitting (4) and the main metal fitting (2) through the vibration-isolating substrate (3), or if the position of the cut-out portion (93) or the position of the drawing needed for the caulking portion is slightly out of place when producing the stopper metal fitting (9), the rotational position between the cylindrical portion (94) of the stopper metal fitting (9) and the stopper portion (42) of the first attachment metal fitting (4) can be adjusted substantially as desired. Besides, even when rotational position is adjusted, caulking operations can be carried out smoothly without causing a clearance between the inside of the caulking portion (91) and the outer circumference of the fastening flange portion (22a), as described above.

The rotational position of the stopper metal fitting (9) with respect to the main metal fitting (2) can be set to avoid interfering with openings, for example for the fastening position on an engine side of the vibration-isolating device (1), notch or through-hole position for drainage or air vent.

Hereinafter, the configuration of the partition portions (10) of the example is described. These are configured so as to provide sufficient vibration-isolating performance by making maximum use of space for the vibration-isolating device (1) which generally has a cross-sectional shape of an elongated circle.

Figure 6:
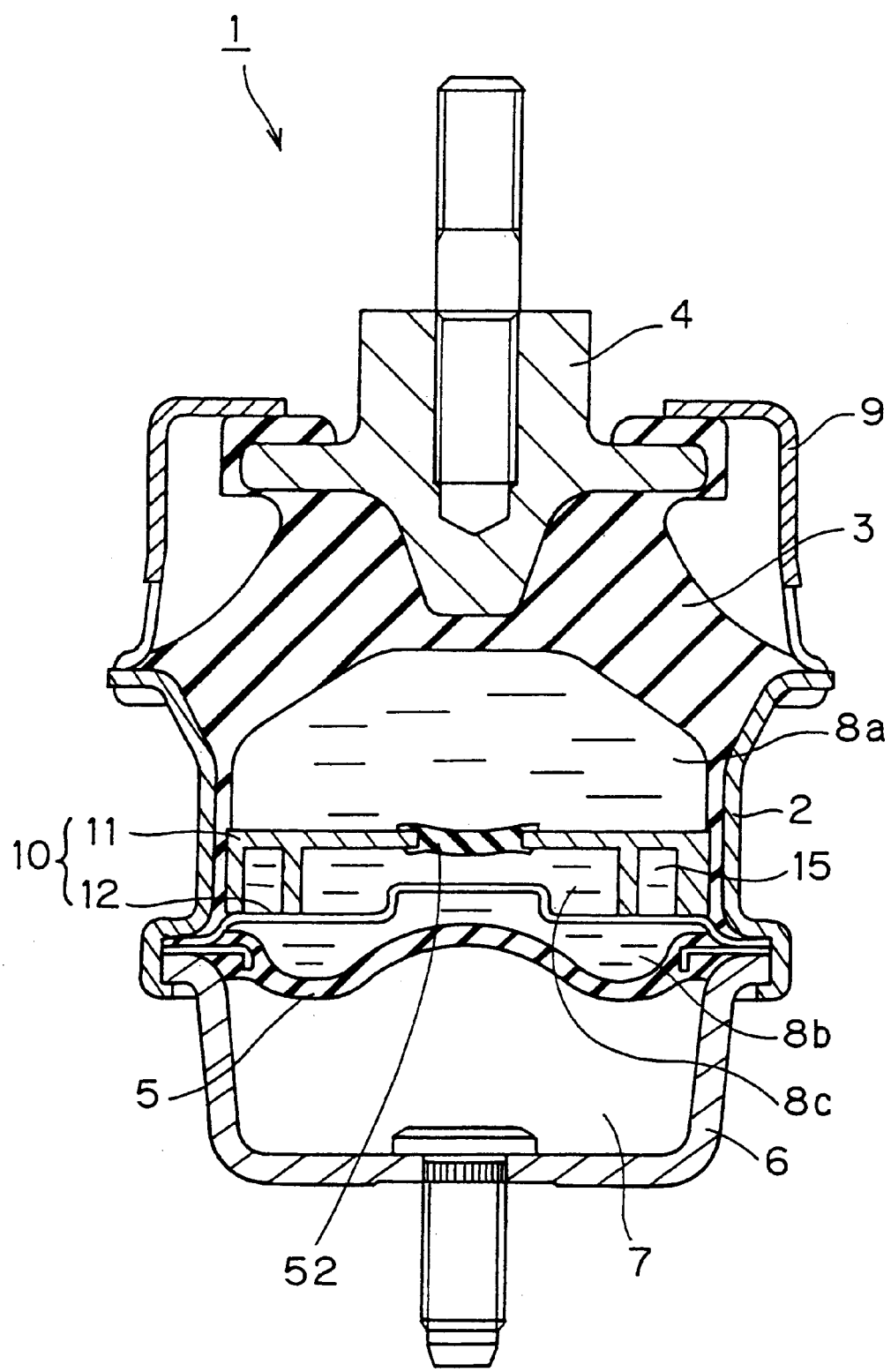
FIG. 6 is a schematic longitudinal section view taken along the line VI—VI in FIG. 2 showing the condition cut along the minor axis of the elongated circle in cross-section with reference to the liquid-containing vibration-isolating device of FIG. 1.

As shown in FIGS. 2 and 6, the partition portion (10) is formed by combining the first partition member (11) made of a metal casting or resin molding with the second partition member (12) which is press molded from a metal plate. The first partition member (11) is provided with an orifice pathway groove on the lower surface side for forming a single orifice pathway (15) and a depressed concave portion for forming a third liquid chamber (8c). A ceiling wall of the depressed concave portion is provided with a generally circular opening to which a second diaphragm (52) is vulcanization adhered. An orifice opening (not shown) is provided on one end of the orifice pathway (15) groove to connect the orifice pathway with the first liquid chamber (8a).

When the first partition member (11) is embedded in the inner circumference of the main metal fitting (2), its upper terminal edge portion is engaged with a stepped portion (31a) provided on the seal rubber layer (31) covering the inner circumference to secure the position in the vertical direction.

The second partition member (12) is made of, for example, a stainless steel plate and covers the orifice pathway groove and the depressed concave portion (11b) from below to form the orifice pathway (15) and the third liquid chamber (8c), respectively. The second partition member (12) is provided on an orifice opening corresponding to the other terminal end of the orifice pathway (15). An opening is provided on the second partition member (12) which faces the diaphragm (52).

The flanged terminal edge portion (14) of the second partition member (12) has generally the same outside diameter as the ring-form metal fitting (51), which retains the first diaphragm (5) on its outer circumferential side, and an opening edge portion (61) of the second attachment metal fitting (6), and caulked to the lower edge (21) of the main metal fitting (2). At the time of the caulking operations, the first partition member (11) and the second partition member (12) are crimped airtight to each other to form the orifice pathway (15). At this time, the third liquid chamber (8c) is formed between the first partition member (11) and the second diaphragm (52) and the second partition member (12). The third liquid chamber (8c) in the partition portion (10) is connected through an opening (13) of the second partition member (12) to the second liquid chamber (8b).

As shown in FIGS. 2 and 6, the second diaphragm (52) having a generally circular shape is eccentrically disposed from the center of the elongated circle to the one end (left end in FIGS. 2 and 6) in the direction of major axis, not disposed at the center of the elongated circle assumed by the partition portion (10). On the right side, that is, on the side where the center of the second diaphragm (52) is not disposed, the orifice pathway (15) has a number of bent or folded portions, whereby the length of orifice pathway (15) required is secured.

Thus, by disposing the second diaphragm (52) eccentrically on the left end side in the partition portion (10) having a generally elongated circle form, the area of the partition portion (10) is effectively put to use to provide sufficient vibration damping performance.

According to the configuration of the example above, by making maximum use of limited installation space of the liquid-containing vibration-isolating device, not only required vibration damping performance can be provided, but also the ease by which it can be mounted into an automobile etc. can be improved.

Furthermore, when attaching the stopper metal fitting (9) to the upper extremity of the main metal fitting (2), the rotational position between the stopper portion (42) of the first attachment metal fitting (4) and the stopper metal fitting (9) is easily adjusted to the optimum condition, allowing the excellent caulking operations and also providing the vibration-isolating device with high reliability.

Being able to make maximum use of limited installation space for the liquid-containing vibration-isolating device, ease of installation into an automobile etc. is improved, the rotational position of the stopper metal fitting can be optimized, and the stopper metal fitting can also be assembled easily and securely.

What is claimed is:

1. A vibration-isolating device, comprising:
    a vibration-isolating substrate formed of a rubber elastomer and having first, and second sides;
    a first metal fitting connected to said first side of said vibration-isolating substrate;
    a cylindrical or annular second metal fitting connected to said second side of said vibration-isolating substrate, said vibration-isolating substrate and said second metal fitting having substantially oval outer circumferential surfaces when viewed in an axial direction;
    a first stopper formed in connection with said first metal fitting;
    an outwardly projecting flange arranged in connection with said second metal fitting; and
    a stopper metal fitting comprising
        a caulking portion caulked and fastened with at least a part of said flange,
        a second stopper arranged close to and abutting said first stopper, and
    a cylinder portion including cutouts such that said caulking portion is not formed at said cutouts and said substrate and said flange are thereby exposed; wherein said stopper metal fitting is substantially cylindrical and said cutouts are provided at and around minor-axis ends of an oval in a vicinity of said flange; wherein said oval is in the shape of a racetrack, and said cutouts coincide with straight-line portions of the racetrack shape.

2. The vibration-isolating device as set forth in claim 1, wherein said caulking portion is arranged at and around major-axis ends of the oval and a diameter of said flange is smaller than a diameter of the imaginary circle in a direction of a minor axis of the oval.

3. The vibration-isolating device as set forth in claim 1 or 2, wherein said first stopper has substantially oval outer circumferential surfaces viewed in the axial direction, said second stopper having an inner circumferential surface facing said outer circumferential surface of said first stopper to maintain a substantially constant clearance therebetween.

4. The vibration-isolating device as set forth in claim 1, wherein said stopper metal fitting has an inward flange for covering said first stopper such that said inward flange abuts said first stopper in the axial direction.

5. The vibration-isolating device as set forth in claim 1, wherein said Stopper metal fitting has an inward flange for covering said first stopper such that said inward flange abuts said first stopper in the axial direction.

6. The vibration-isolating device as set forth in claim 1, further comprising first and second liquid chambers, a liquid pathway connecting said first and second chambers, and a partition defining said pathway and a diaphragm between said first and second chambers, said partition being oval, and said diaphragm being arranged at and proximate a major-axis end of the oval.

7. The vibration-isolating device as set forth in claim 1, wherein said substrate has an extension arranged to cover said first stopper of said first metal fitting, said extension being interposed between said first metal fitting and said second stopper of said stopper metal fitting.

8. The vibration-isolating device as set forth in claim 1, wherein said flange is formed on a main metal fitting coupled to said second metal fitting.

9. The vibration-isolating device as set forth in claim 1, wherein said stopper metal fitting has an inverted L-shape and includes a cylindrical portion, said second stopper being a second stopper flange extending inward from said cylindrical portion to cover said first stopper, said caulking portion being on an opposite side of said cylindrical portion from said second stopper flange.

10. The vibration-isolating device as set forth in claim 1, wherein said cylindrical portion of said stopper metal fitting is arranged relative to said first stopper to define a space between said first stopper and said cylindrical portion whereby said cylindrical portion is effective to limit lateral displacement of said first metal fitting.

11. The vibration-isolating device as set forth in claim 1, wherein said caulking portion includes two sections separated from one another such that two portions of said flange between said two sections of said caulking portion are not in engagement with said caulking portion.

12. The vibration-isolating device as set forth in claim 1, wherein said caulking portion is arranged only at locations along semi-circular portions of an elongated circular shape assumed by an outer edge of said substrate.

13. The vibration-isolating device as set forth in claim 1, wherein outer edges of said caulking portion of said stopper metal fitting and said flange trace along an imaginary circle around a central axis of the vibration-isolating device, at least at areas caulked and fastened with each other.

14. The vibration-isolating device as set forth in claim 1, wherein said flange has two semi-circular outer portions in engagement with said caulking portion and two straight outer portions between said semi-circular outer portions not in engagement with said caulking portion.

* * * * *